No. 833,349. PATENTED OCT. 16, 1906.
M. J. STARKEY & G. H. HAFLICH.
COUPLING FOR SURFACE ROD LINES.
APPLICATION FILED FEB. 3, 1906.

WITNESSES:

INVENTORS
Martin J. Starkey
George H. Haflich
BY Thomas L. Ryan
ATTORNEY

UNITED STATES PATENT OFFICE.

MARTIN J. STARKEY AND GEORGE H. HAFLICH, OF MONTPELIER, INDIANA.

COUPLING FOR SURFACE ROD-LINES.

No. 833,349.  Specification of Letters Patent.  Patented Oct. 16, 1906.

Application filed February 3, 1906. Serial No. 299,300.

*To all whom it may concern:*

Be it known that we, MARTIN J. STARKEY and GEORGE H. HAFLICH, citizens of the United States, residing at Montpelier, in the county of Blackford and State of Indiana, have invented a new and useful Coupling for Surface Rod-Lines, of which the following is a specification.

Our invention relates to improvements in couplings for surface rod-lines, and has especial reference to couplings for the rod-lines known as "surface" rods or "shackle-rods" used in the transmission to pumping mechanisms of oil-well apparatus of the power from the driving machinery therefor.

In the couplings now in use for the purpose named it is found in practice that the long-continued imposition thereon of the severe and sudden tensile strains incident to the operation of the surface rod-lines will cause the same to become loose, the effect being that the couplings not only rapidly become worn and unreliable, but the frequent attention and care of operatives are needed to keep the same tightened and in place. Moreover, the rods frequently become damaged by bending or fracture.

The objects of our invention are to overcome these faults and provide a device of the kind described which will be simple in construction and of economical manufacture and which will retain securely together the ends of the numerous rods composing said rod-lines and which will prevent the working loose or apart of the same under the intermittent and severe strains normally imposed upon them.

A further object is to provide such a coupling in which the use of any and all forms of bolts, screws, or hinge-joints may be dispensed with.

These and other objects we attain by the construction illustrated in the accompanying drawings, in which—

Figure 1:
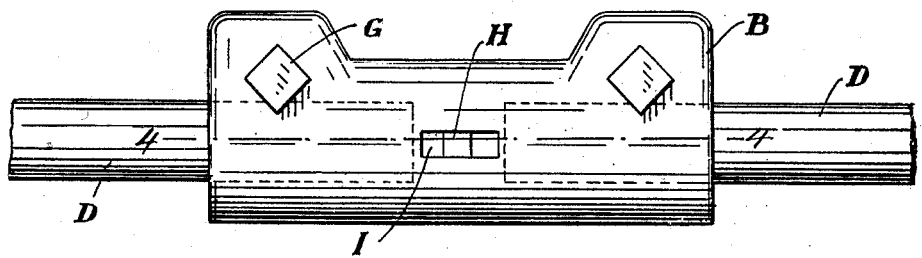
Figure 2:
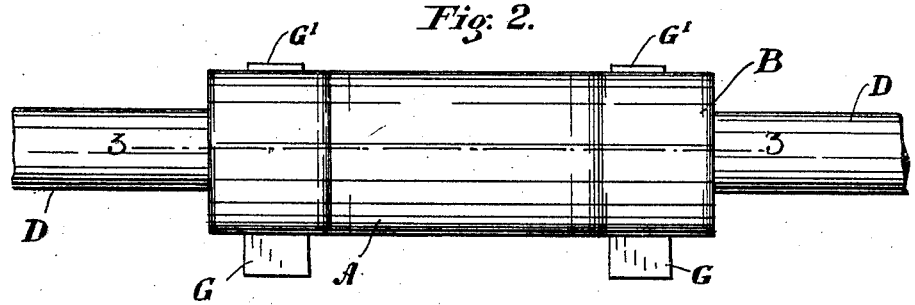
Figure 3:
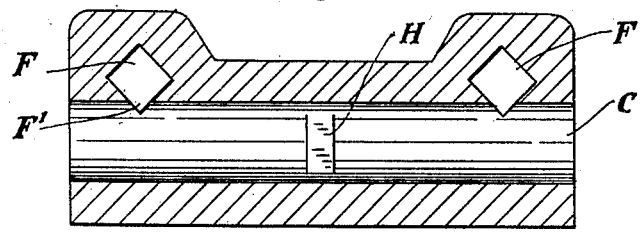
Figure 4:
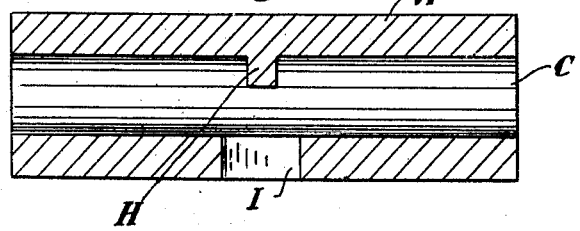
Figure 5:
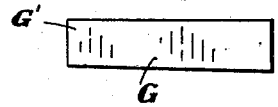

Figure 1 is a side view of our improved coupling with rods secured therein, portions of the latter being broken away. Fig. 2 is a top view of the same. Fig. 3 is a vertical longitudinal section of the same on the line 3 3, Fig. 2, with the rods removed. Fig. 4 is a horizontal longitudinal section of the same on the line 4 4, Fig. 1; and Fig. 5 is a detached view of one of the lock-keys.

Similar letters refer to corresponding parts throughout the several views.

The body A of our improved coupling is cylindrical in general form and may be made of wrought or malleable iron or of steel and is provided at its ends with the enlarged portions B, and throughout its length is the uniformly-extending aperture C, which may be circular or otherwise in form to suit in general contour the form in cross-section of the rods which it may be desired to introduce therein. The rods D, shown secured in the coupling, are the ordinary round rods commonly used for the purposes referred to.

The enlarged portions B of the body of the coupling are provided with the transversely-extending square openings F, so positioned with reference to the horizontal center of the body of the coupling that the corner F' extends or "cuts" through a portion of the aperture C, as shown in Fig. 3. Adapted to reside within and pass through the openings F are the lock-keys G, square in cross-section, slightly tapering longitudinally, the ends G' being of slightly smaller dimension than the opposite ends. These lock-keys are made of steel of suitable degree of hardness and of sufficiently accurate dimensions with reference to the openings F so that when the rods D are inserted into the body of the coupling and these lock-keys are driven into the openings F they will in their travel through the openings cut their way through the edge of the rods. When the lock-keys are driven through a sufficient distance so that the ends G' project beyond the side of the coupling, as shown in Fig. 2, the rods will have been securely locked in position. The lock-keys having cut their way through the edge of the rod and become embedded therein on the corners F', the rods will be retained rigidly and securely against the most severe strains. At the same time the lock-keys may be readily removed by the application of the hammer by the operative at the ends G' of the keys.

H designates a lug formed integrally upon the interior of the coupling equidistant from the ends thereof, the function of which is to prevent the rods which may be inserted into the opposite ends of the coupling from passing beyond their correct positions.

I designates a slot provided in the wall of the coupling, communicating with the central aperture, through which may be inserted a suitable instrument, when after the lock-keys are removed the rods may be jolted or driven loose.

We do not desire to limit ourselves to the use of simply one lock-key at each end of our improved coupling, as it is obvious more than that number and a diversity in the arrangement could be effected without departing from the nature of our invention.

From the foregoing description the mode of the use and practice of our invention will be apparent. A further advantage afforded is that defects on the ends of the rods will not prevent their use. Thus the surface rods, which may become worn at their intermediate portion where the same are supported on bearings in the fields over which the same are operated, instead of being abandoned may be simply cut into and connected successfully together with our improved coupling.

What we claim as our invention, and desire to secure by Letters Patent of the United States, is—

A rod-coupling of the kind described comprising a sleeve having continuous longitudinal aperture therein, and having lateral exterior enlargements thereon at its opposite ends, said enlargements being provided with transversely-extending openings, a portion of said openings communicating with said longitudinal aperture, and angularly-formed tapered lock-keys adapted to fit snugly within and to pass through said transverse openings and said sleeve being provided with a lug formed integrally on its interior and equidistant from its ends, and the wall of the sleeve having a longitudinal slot therein opposite the said lug and equidistant from the ends of the sleeve.

In testimony whereof we have hereunto signed our names to this specification in the presence of two subscribing witnesses.

MARTIN J. STARKEY.
GEORGE H. HAFLICH.

Witnesses:
ELMER E. BOTKIN,
CLARA A. PRIDDY.